United States Patent
Atkinson et al.

(10) Patent No.: US 12,437,860 B2
(45) Date of Patent: Oct. 7, 2025

(54) DETECTION, IDENTIFICATION, AND VERIFICATION OF PATIENTS INVOLVED IN DIAGNOSTIC SESSIONS

(71) Applicant: Verily Life Sciences LLC, Mountain View, CA (US)

(72) Inventors: Ian Atkinson, Oak Park, IL (US); Ryan Kramer, San Francisco, CA (US); Eliezer Glik, San Francisco, CA (US); Aaron Haywood Stoertz, Redwood City, CA (US)

(73) Assignee: Verily Life Sciences LLC, Dallas, TX (US)

( * ) Notice: Subject to any disclaimer, the term of this patent is extended or adjusted under 35 U.S.C. 154(b) by 458 days.

(21) Appl. No.: 17/923,683

(22) PCT Filed: May 10, 2021

(86) PCT No.: PCT/US2021/031585
§ 371 (c)(1),
(2) Date: Nov. 7, 2022

(87) PCT Pub. No.: WO2021/226588
PCT Pub. Date: Nov. 11, 2021

(65) Prior Publication Data
US 2023/0187056 A1    Jun. 15, 2023

Related U.S. Application Data

(60) Provisional application No. 63/022,203, filed on May 8, 2020.

(51) Int. Cl.
*G16H 30/40*    (2018.01)
*A61B 3/00*    (2006.01)
(Continued)

(52) U.S. Cl.
CPC ......... *G16H 30/40* (2018.01); *A61B 3/0025* (2013.01); *A61B 3/12* (2013.01); *A61B 3/14* (2013.01);
(Continued)

(58) Field of Classification Search
CPC .......... A61B 3/0025; A61B 3/12; A61B 3/14; G16H 30/20; G16H 30/40; G16H 50/20;
(Continued)

(56) References Cited

U.S. PATENT DOCUMENTS

2006/0095429 A1    5/2006   Abhyankar et al.
2008/0259274 A1    10/2008  Chinnock
(Continued)

FOREIGN PATENT DOCUMENTS

JP    2008061848 A    3/2008
JP    2014128620 A    7/2014

OTHER PUBLICATIONS

PCT Search Report and Written Opinion for PCT/US2021/031585 mailed Oct. 18, 2021 (18 pages).
(Continued)

*Primary Examiner* — Jack Dinh
(74) *Attorney, Agent, or Firm* — Perkins Coie LLP

(57) ABSTRACT

Introduced here are approaches to ensuring that digital images generated during diagnostic sessions are properly associated with the appropriate patients. By implementing these approaches, a diagnostic platform can minimize the time needed to manually input information prior to a diagnostic session and improve the accuracy of this information.

6 Claims, 13 Drawing Sheets

(51) Int. Cl.
  *A61B 3/12*   (2006.01)
  *A61B 3/14*   (2006.01)
  *G06V 40/14*  (2022.01)
  *G06V 40/18*  (2022.01)
  *G16H 30/20*  (2018.01)

(52) U.S. Cl.
  CPC ............ *G06V 40/14* (2022.01); *G06V 40/197* (2022.01); *G16H 30/20* (2018.01); *G06V 2201/03* (2022.01)

(58) Field of Classification Search
  CPC ... G06V 40/14; G06V 40/197; G06V 2201/03
  See application file for complete search history.

(56) References Cited

U.S. PATENT DOCUMENTS

| | | |
|---|---|---|
| 2010/0183199 A1 | 7/2010 | Smith et al. |
| 2013/0336545 A1 | 12/2013 | Pritikin et al. |
| 2015/0078671 A1 | 3/2015 | Van Deventer et al. |
| 2018/0303667 A1 | 10/2018 | Peyman |

OTHER PUBLICATIONS

WIPO International Preliminary Report on Patentability, WO Patent Application No. PCT/US21/31585, Nov. 17, 2022.

500

501
Acquire a first digital image generated by a retinal camera based on light collected through a lens 502
Acquire a second digital image generated by a secondary camera located proximate to the lens of the retinal camera 503
Analyze the second digital image to determine whether the first digital image includes the left eye or the right eye of a patient 504
Label the first digital image as being representative of either the left eye or the right eye 505
Store the first digital image in a profile

Generate a notification that instructs a patient to place her eye near a secondary camera located proximate to the lens of a retinal camera

702

Acquire a digital image of the eye that was generated by the secondary camera

703

Compare the digital image to a database of digital images generated during past diagnostic sessions

704

Determine that the digital image matches an entry in the database

705

Identify a patient profile that is associated with the matching entry in the database

706

Populate a data structure with personal information obtained from the patient profile

Generate a notification that instructs a patient to place an identity document near a secondary camera located proximate to the lens of a retinal camera

802

Acquire a digital image of the identity document that was generated by the secondary camera

803

Derive information related to the patient by applying an optical character recognition (OCR) algorithm to the digital image

804

Populate a data structure with at least some of the information

1001
Generate a notification that instructs a patient to place a Quick Response (QR) code near a secondary camera located proximate to the lens of a retinal camera 1002
Examine the QR code to obtain information embedded therein 1003
Populate a data structure based on the information

Acquire a first digital image generated by a retinal camera based on light collected through a lens

1102

Apply a diagnostic model to the first digital image to produce an output that is indicative of the health state of a patient

1103

Determine that confidence in the output falls beneath a threshold

1104

Cause the retinal camera to generate a second digital image under different conditions than the first digital image

1105

Analyze the second digital image to determine whether the first digital image includes the left eye or the right eye of the patient

1106

Label the first digital image as being representative of the left eye or the right eye

1107

Store the first digital image in a profile

FIGURE 11

DETECTION, IDENTIFICATION, AND VERIFICATION OF PATIENTS INVOLVED IN DIAGNOSTIC SESSIONS

CROSS-REFERENCE TO RELATED APPLICATIONS

This application is a national stage entry of International Patent Application No. PCT/US2021/031585, titled "Detection, Identification, and Verification of Patients Involved in Diagnostic Sessions" and filed on May 10, 2021, which claims priority to U.S. Provisional Application No. 63/022,203, filed on May 8, 2020, each of which is incorporated herein by reference in its entirety.

TECHNICAL FIELD

Various embodiments concern computer programs and associated computer-implemented techniques for ensuring that digital images generated during diagnostic sessions are properly associated with the appropriate patients.

BACKGROUND

The process by which visual representations of a human body are captured is referred to as "medical imaging" or "biological imaging." Generally, medical imaging seeks to reveal internal structures that are hidden by the skin, bones, or organs in order to detect the presence of a disease. For example, a series of digital images corresponding to different aspects of the anatomy of the human body may make it possible to more readily identify abnormalities that are indicative of a disease.

A variety of different technologies may be used to capture these digital images. Examples of such technologies include x-ray, magnetic resonance imaging (MRI), ultrasonography or ultrasound, endoscopy, microscopy, elastography, tactile imaging, thermography, computed tomography (CT), fluoroscopy, angiography, mammography, positron emission tomography (PET), single photon emission computed tomography (SPECT), and the like.

Due to the importance of these digital images, it is critical that these digital images be associated with the appropriate body part of the appropriate patient. However, this has become increasing difficult as operators are asked to complete imaging sessions (also referred to as "diagnostic sessions") more quickly and the number of digital images generated during diagnostic sessions continues to grow.

BRIEF DESCRIPTION OF THE DRAWINGS

FIG. 5 depicts a flow diagram of a process for labelling a digital image generated by a retinal camera based on information gleaned from another digital image generated by a secondary camera located proximate to the lens through which light is collected by the retinal camera.

FIG. 7 depicts a flow diagram of a process for identifying a patient by comparing a digital image generated by a secondary camera to a database of digital images generated during past diagnostic sessions.

FIG. 8 depicts a flow diagram of a process for identifying a patient based on information that is derived from an identity document.

FIG. 10 depicts a flow diagram of a process for identifying a patient using identifiers that are presented to a retinal camera outside of a diagnostic session.

FIG. 11 depicts a flow diagram of a process for performing closed loop analysis by examining digital images generated under different conditions.

Figure 1:
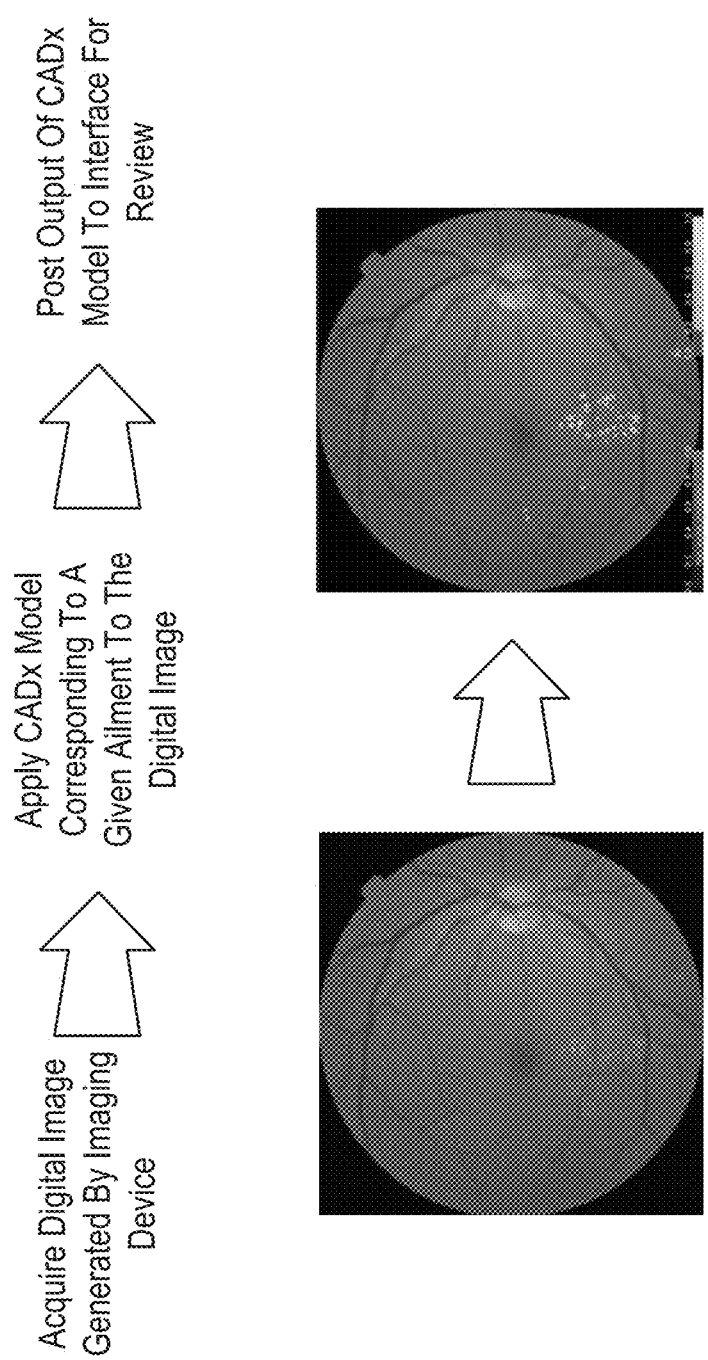
FIG. 1 illustrates an example of a scenario in which a diagnostic platform acquires a digital image generated by an imaging device (here, a retinal camera), applies a computer-aided diagnostic (CADx) model corresponding to a given ailment to the digital image, and then posts an output produced by the CADx model to an interface for review.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Imaging has historically been an effective means for detecting a variety of ailments. For example, radiological imaging has been shown to be the most effective means for early detection of breast cancer and diabetic retinopathy, among other ailments. However, differentiating the features in a digital image can be difficult. For instance, the differences between benign and malignant growths may be largely indistinguishable to the human eye.

Accordingly, computer-aided diagnosis technologies have become a routine part of clinical work in several areas of medicine. To improve the accuracy of image interpretation, a diagnostic platform may apply one or more computer-aided diagnostic (CADx) models to a digital image. FIG. 1 illustrates an example of a scenario in which a diagnostic platform acquires a digital image generated by an imaging device (here, a retinal camera), applies a CADx model corresponding to a given ailment to the digital image, and then posts an output produced by the CADx model to an interface for review by a healthcare professional. In some instances the output is a proposed diagnosis with respect to the given ailment, while in other instances the output is intended to facilitate the rendering of a diagnosis. For example, the output may visually highlight the portions of the digital image that the diagnostic platform determined are diagnostically relevant.

Generally, each CADx model is representative of a collection of algorithms that are applied to a digital image to produce an output that conveys information about a corresponding ailment or disease (collectively referred to as "medical conditions"). The output is normally considered as a "second opinion" by the healthcare professional responsible for interpreting the digital image. Thus, CADx models can act as decision aids for healthcare professionals in characterizing the features of digital image.

Figure 2:
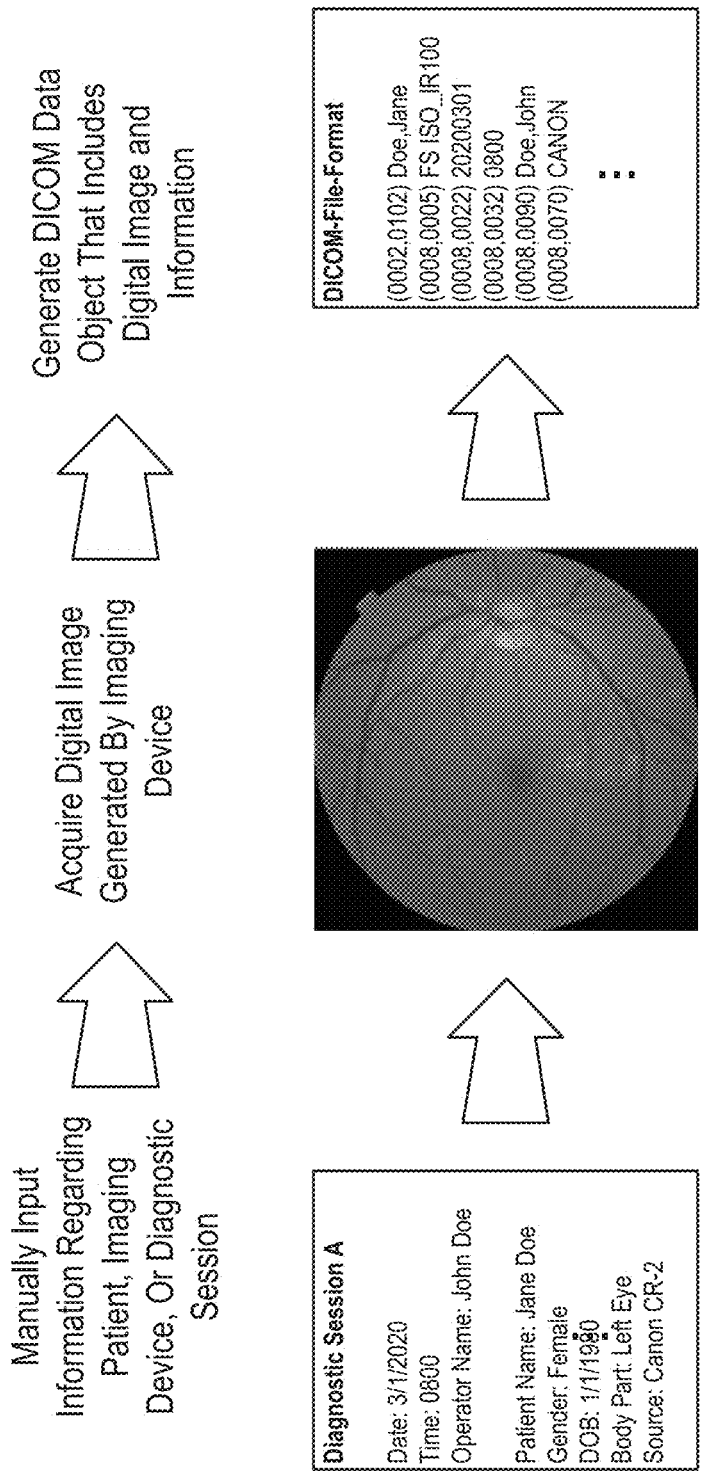
FIG. 2 depicts a high-level flow diagram of a process for providing information that can be used to verify the identity of a patient.

These decision aids are only useful in the proper context, however, so verifying that each digital image is associated with the appropriate patient is a critical part of the diagnostic process. Diagnostic platforms have historically confirmed the identities of patients based on information that is manually input before, during, or after the diagnostic sessions in which those patients were imaged. FIG. 2 depicts a high-level flow diagram of a process for providing information that can be used to verify the identity of a patient. While the process is described in the context of a Digital Imaging and Communications in Medicine (DICOM) data object, those skilled in the art will recognize that the process is similarly applicable to data structures in other formats.

Initially, an operator manually inputs information in order to verify that the correct patient is being imaged. For instance, the operator may input the name, gender, or date of birth of the patient into the imaging device to be used during the diagnostic session. Other information could also be manually input by the operator, such as the body part being imaged, the model of the imaging device, the start time of the diagnostic session, and the like. Thereafter, the operator will use the imaging device to generate a digital image. Digital images generated during diagnostic sessions will often include one or more physiological structures of interest rather than the entirety of the human body. For example, a retinal camera may be configured to generate retinal images that depict the retina, optic disk, and blood vessels within the eye. A DICOM data object can then be created that includes not only the pixel data of the digital image but also at least some of the information manually input by the operator.

Because it takes several minutes to manually input the information, improving the rate at which diagnostic sessions are conducted can be difficult—even as imaging devices are further improved. Moreover, manual entry of this information results in frequent mistakes. For instance, a digital image of one body part (e.g., the left eye) may be mislabeled as another body part (e.g., the right eye), or a typographical error may be made when entering the name or date of birth. In the best case, these mistakes reduce the efficiency of image interpretation. In the worst case, these mistakes have significant irreversible effects. For instance, if a digital image of a patient suffering from an ailment is mislabeled, the patent may remain in an undiagnosed, and thus untreated, state.

Some clinical environments have attempted to minimize misidentification of patients by employing a scheduling system that uses a worklist populated with personal information derived from the medical record associated with each patient. But this approach only reduces the frequency of some mistakes (e.g., typographical errors). Other mistakes will occur to occur. For instance, the operator of the imaging device may still mislabel the body part being imaged or select the wrong patient when browsing the worklist.

Introduced here, therefore, are several different approaches to ensuring that digital images generated during diagnostic sessions are properly associated with the appropriate patients. By implementing these approaches, a diagnostic platform can lessen the time needed to manually input information prior to a diagnostic session and improve the accuracy of this information. Moreover, by implementing these approaches, the diagnostic platform may improve security by limiting the amount of information that needs to be entered and/or stored on the imaging device. For example, if a diagnostic platform is able to infer the identity of the patient without requiring that sensitive information be input into the imaging device, then the diagnostic platform could refrain from associating digital images generated by the imaging device with patient information until those digital images are stored in a secure location (e.g., a computer server that is connected to the imaging device across a network). This approach inhibits the ability of unauthorized entities (also referred to as "attackers") from accessing patient information.

Thus, the diagnostic platform may initially acquire a first digital image of an eye of a patient. The diagnostic platform can then acquire a second digital image of the eye of the patient or an identity object that is associated with the patient. Examples of identity objects include identity documents and machine-readable identifiers. In some embodiments, the first and second digital images are generated by a retinal camera based on light reflected by the retina of the eye and through the lens of the retinal camera. In other embodiments, the first digital image is generated by the retinal camera based on light reflected by the retina of the eye and through the lens of the retinal camera, while the second digital image is generated by a secondary camera located proximate to the lens of the retinal camera. Thereafter, the diagnostic platform can determine, based on the second digital image, a profile indicative of the provenance of the first digital image. The profile may be determined based on a characteristic of the eye as determined from the second digital image. Examples of characteristics include the location of the eye (e.g., with respect to another facial feature, such as the nose, mouth, or other eye), the color of the eye, or the vein pattern of the eye. The diagnostic platform can then populate a data structure encoded with the first digital image with information obtained from the profile prior to delivering the first digital image to an interface for diagnostic determination. This data structure may be used to populate information related to the patient on the interface that may be useful (e.g., to a medical professional) in rendering an appropriate diagnosis.

Embodiments may be described with reference to particular medical conditions, imaging devices, computer programs, etc. However, those skilled in the art will recognize that the features are similarly applicable to other medical conditions, imaging devices, computer programs, etc. For example, although embodiments may be described in the context of retinal cameras that generate digital images of retinas over the course of diagnostic sessions, the relevant features may be similarly applicable to imaging devices designed to generate digital images of other anatomical regions of the human body.

Moreover, while embodiments may be described in the context of computer-executable instructions for the purpose of illustration, aspects of the technology can be implemented via hardware, firmware, or software. As an example, embodiments may include a machine-readable medium having instructions that may be used to program a computing device to perform a process for verifying the identity of a patient prior to a diagnostic session and then ensuring that digital images generated during the diagnostic session are programmatically attributed to the patient.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, and/or hardware components. Modules are typically functional components that generate output(s) based on specified input(s). A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Diagnostic Platform

Figure 3:
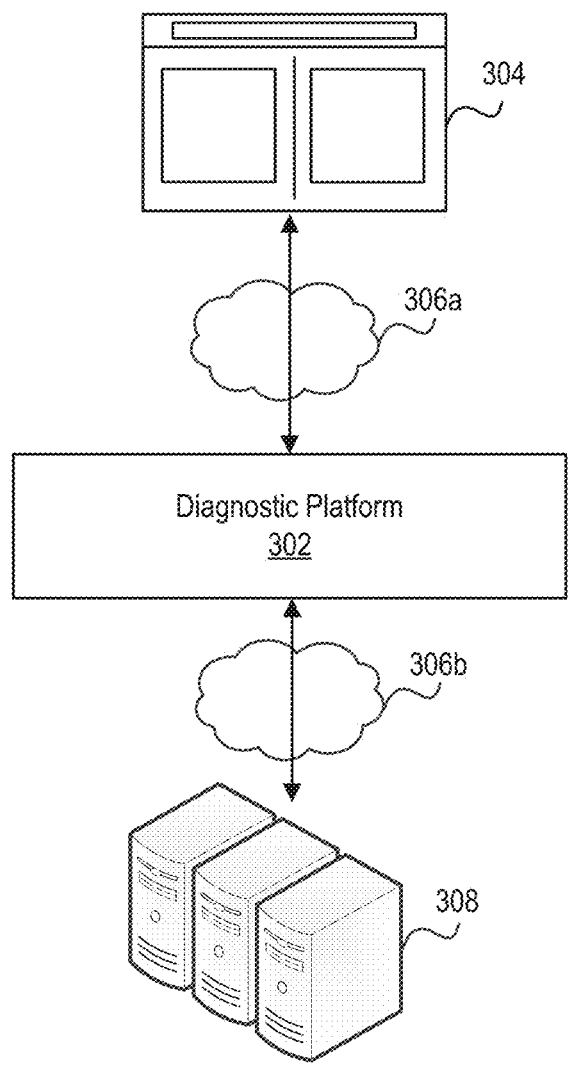
FIG. 3 illustrates a network environment that includes a diagnostic platform.

FIG. 3 illustrates a network environment 300 that includes a diagnostic platform 302. Individuals can interact with the diagnostic platform 302 via an interface 304. For example, an operator of an imaging device may access the interface 304 to initiate a diagnostic session in which a patient (also referred to as a "subject") is to be imaged. As another example, a healthcare professional may access the interface 304 to review the digital images generated by an imaging device in order to diagnose the human bodies captured in those digital images. Moreover, healthcare professionals may access the interface 304 to review the outputs produced by CADx models (also referred to as "diagnostic models") that have been applied to those digital images. Diagnostic models may be applied to digital images generated during a diagnostic session in order to identify the regions of pixels that are clinically or diagnostically relevant. When applied to a digital image, a diagnostic model may produce an output that is indicative of the health state of a corresponding patient. Some diagnostic models produce proposed diagnoses that can be examined by a healthcare professional, while other diagnostic models produce a visualization component (or simply "visualization") intended to help the healthcare professional render a diagnosis. The term "health state" can refer to the physical health of the patient with respect to a given ailment. For example, a diagnostic platform could be designed to identify digital features that are known to be indicative of diabetic retinopathy, glaucoma, etc.

As shown in FIG. 3, the diagnostic platform 302 may reside in a network environment 300. Thus, the diagnostic platform 302 may be connected to one or more networks 306a-b. The network(s) 306a-b can include personal area networks (PANs), local area networks (LANs), wide area networks (WANs), metropolitan area networks (MANs), cellular networks, the Internet, etc. Additionally or alternatively, the diagnostic platform 302 can be communicatively coupled to computing device(s) over a short-range wireless connectivity technology, such as Bluetooth® or Near Field Communication (NFC).

The interface 304 is preferably accessible via a web browser, desktop application, mobile application, or over-the-top (OTT) application. Accordingly, the interface 304 may be viewed on an imaging device, personal computer, tablet computer, mobile workstation, mobile phone, game console, wearable electronic device (e.g., a watch or fitness accessory), network-connected ("smart") electronic device, (e.g., a television or home assistant device), or virtual/augmented reality system (e.g., a head-mounted display).

Some embodiments of the diagnostic platform 302 are hosted locally. That is, the diagnostic platform 302 may reside on the computing device used to access the interface 304. For example, the diagnostic platform 302 may be embodied as a mobile application executing on a mobile phone. As another example, the diagnostic platform 302 may be embodied as a desktop application executing on an imaging device.

Other embodiments of the diagnostic platform 302 are executed by a cloud computing service operated by, for example, Amazon Web Services®, Google Cloud Platform™, or Microsoft Azure®. In such embodiments, the diagnostic platform 302 may reside on a network-accessible server system 308 comprised of one or more computer servers. These computer servers can include digital images generated by imaging devices, patient information (e.g., age, sex, health diagnoses, etc.), imaging device information (e.g., resolution, expected file size, etc.), diagnostic models, and other assets. For example, profiles that include digital images associated with different patients, diagnostic sessions, imaging devices, healthcare facilities (e.g., hospitals, clinics, optometry offices), healthcare networks, etc. Those skilled in the art will recognize that this information could also be distributed amongst a network-accessible server system and one or more computing devices.

Figure 4:
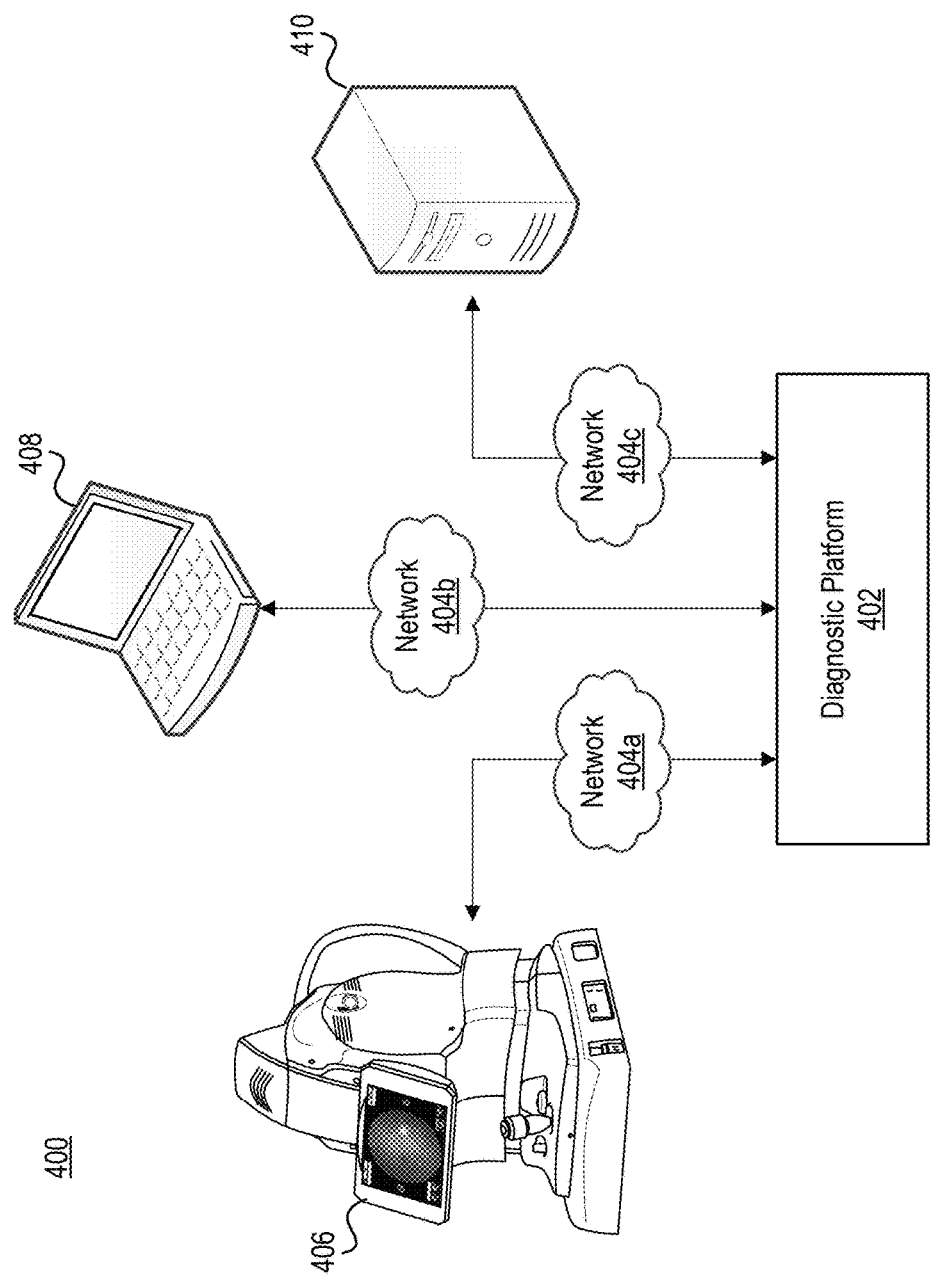
FIG. 4 depicts an example of a communication environment that includes a diagnostic platform configured to acquire data from one or more sources.

FIG. 4 depicts an example of a communication environment 400 that includes a diagnostic platform 402 configured to acquire data from one or more sources. Here, the diagnostic platform 402 may receive data from a retinal camera 406, laptop computer 408, or network-accessible server system 410 (collectively referred to as the "networked devices"). For example, the diagnostic platform 402 may obtain pixel data from the retinal camera 406 and other data (e.g., patient information, diagnostic models, processing operations) from the laptop computer 408 or network-accessible server system 410.

The networked devices can be connected to the diagnostic platform 402 via one or more networks 404a-c. The network(s) 404a-c can include PANs, LANs, WANs, MANs, cellular networks, the Internet, etc. Additionally or alternatively, the networked devices may communicate with one another over a short-range wireless connectivity technology, such as Bluetooth or NFC. For example, if the diagnostic platform 402 resides on the network-accessible server system 410, data received from the network-accessible server system 410 need not traverse any networks. However, the network-accessible server system 410 may be connected to the retinal camera 406 and laptop computer 408 via separate Wi-Fi communication channels.

Embodiments of the communication environment 400 may include a subset of the networked devices. For example, some embodiments of the communication environment 400 include a diagnostic platform 402 that receives pixel data from the retinal camera 406 (e.g., in the form of DICOM data objects) and additional data from the network-accessible server system 410 on which it resides. As another example, some embodiments of the communication environment 400 include a diagnostic platform 402 that receives pixel data from a series of retinal cameras located in different environments (e.g., different clinics).

Methodologies for Identifying, Detecting, and Verifying Patients

Introduced here are several approaches to improving the accuracy of personal information that is associated with patients. Historically, personal information has been manually input by an operator outside of a diagnostic session in which a patient is imaged. For instance, the personal information could be manually input into an imaging device or another computing device that is communicatively connected to the imaging device. But this process is slow and prone to mistakes as discussed above.

The approaches described herein improve the likelihood that each digital image generated by an imaging device is associated with the appropriate patient, as well as lessen the time needed to input personal information. As such, these approaches may enable the rate at which patients are imaged to be increased by improving the efficiency of the initiation procedure in which personal information is specified. Moreover, these approaches may serve to improve security by limiting the amount of personal information that is stored on the imaging device. Simply put, these approaches may permit less personal information to be stored on the imaging device. While at least some personal information may be stored in multiple locations (e.g., the imaging device and another computing device, such as a computer server, that is responsible for analyzing digital images generated by the computer device), a limited amount of personal information may be stored in one of those locations, thereby lessening the potential harm of unauthorized access.

Note that these approaches can be employed independent of one another. Accordingly, while the approaches are described separately for the purpose of simplification, those skilled in the art will recognize that these approaches (or aspects of each approach) could be performed in combination. Moreover, while these approaches are described in the context of a retinal camera, those skilled in the art will recognize that the approaches are similarly applicable to other imaging devices.

FIG. 5 depicts a flow diagram of a process 500 for labelling a digital image generated by a retinal camera based on information gleaned from another digital image generated by a secondary camera located proximate to the lens through which light is collected by the retinal camera. Initially, a diagnostic platform can acquire a first digital image that was generated by the retinal camera based on light collected through the lens (step 501). Generally, the first digital image is one of multiple digital images of the retina that are generated by the retinal camera over the course of a diagnostic session involving a patient.

The diagnostic platform can also acquire a second digital image that was generated by the secondary camera (step 502). As further discussed below with respect to FIGS. 6A-C, the secondary camera may be located directly adjacent to the lens of the retinal camera so that as the patient places her eye near the lens, the secondary camera will be able to observe a portion of her face. Then, the diagnostic platform can analyze the second digital image to determine whether the first digital image includes the left eye or the right eye of the patient (step 503). For example, the diagnostic platform may apply an algorithm that is designed to detect facial features, such as the nose, mouth, cheeks, or ears, to the pixel data of the second digital image. As another example, the diagnostic platform may apply an algorithm that is designed to infer which eye is presently located in front of the lens based on the orientation and/or position of the eyebrow, eyelids, lacrimal caruncle, lateral commissure, medial commissure, and the like. For instance, the diagnostic platform could infer whether the left eye or the right eye is included in the second digital image based on the shape of the eye as defined by the upper and lower eyelids, or the diagnostic platform could infer whether the left eye or the right eye is included in the second digital image based on the path of the upper eyelid. Similarly, the diagnostic platform could infer whether the left eye or the right eye is included in the second digital image based on the portion of the iris that is visible.

Based on this analysis, the diagnostic platform can label the first digital image as being representative of either the left eye or the right eye (step 504). For instance, the diagnostic platform may automatically populate a field in a data structure formatted in accordance with a medical image standard (e.g., DICOM) with a left eye label or a right eye label. In some embodiments, this data structure is presented on an interface for review, for example, by the operator responsible for managing the diagnostic session. Additionally or alternatively, the diagnostic platform may store the first digital image in a profile (step 505). For example, the profile may contain digital images that are associated with a given patient, generated by a given retinal camera, generated over a given interval of time, generated during a given diagnostic session, generated at a given healthcare facility, generated by a given healthcare network, etc. Accordingly, the profile may include all digital images that are associated with the patient. Alternatively, the profile may include all digital images that are generated during the diagnostic session. In such embodiments, each session-specific profile may be associated with a file corresponding to the patient, so that digital images captured across multiple diagnostic sessions can be readily compared.

Figure 6A:
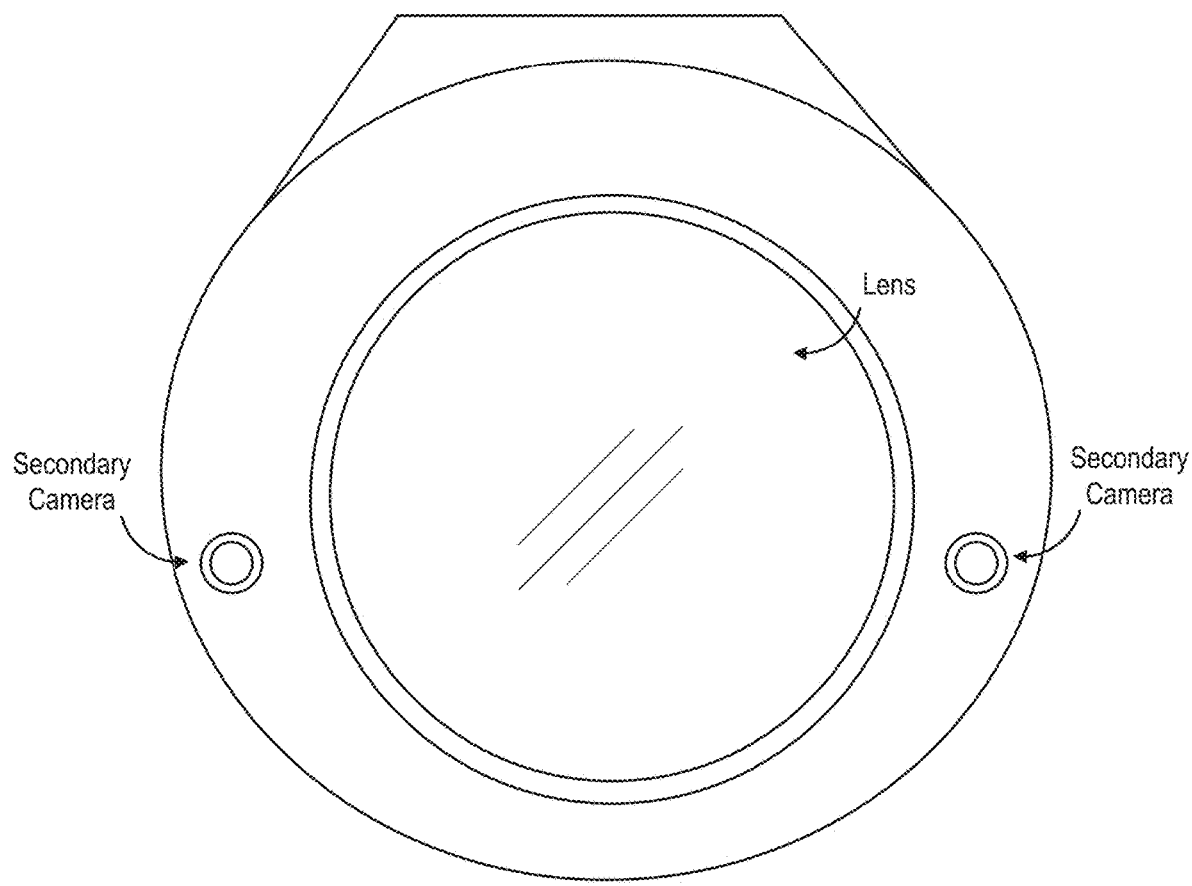
FIG. 6A illustrates how, in some embodiments, a pair of secondary cameras are circumferentially arranged along opposing sides of the lens through which light is collected by a retinal camera.

FIG. 6A illustrates how, in some embodiments, a pair of secondary cameras are circumferentially arranged along opposing sides of the lens through which light is collected by a retinal camera. Generally, the secondary cameras are arranged such that the area surrounding the eye is observable when the patient aligns her retina with the lens. Accordingly, these secondary cameras may be referred to as "pupil cameras" or "ocular cameras."

Figure 6C:
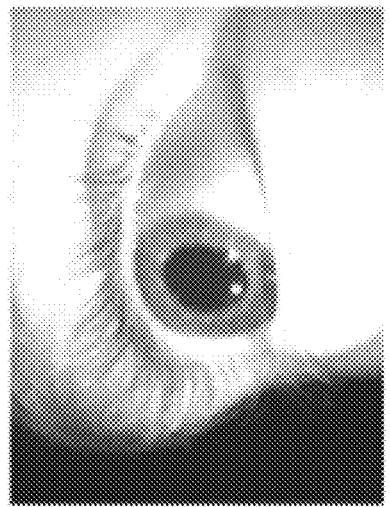
FIGS. 6B-C include examples of digital images that were generated secondary cameras circumferentially arranged along opposing sides of the lens.
Figure 6B:
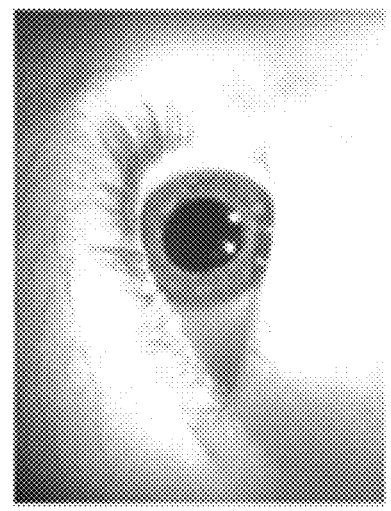

However, other facial features may also be observable by the secondary cameras as can be seen in FIGS. 6B-C. FIGS. 6B-C include examples of digital images that were generated secondary cameras circumferentially arranged along opposing sides of the lens. As discussed above with respect to FIG. 5, these digital images may be analyzed in order to determine whether the left eye or the right eye is presently located in front of the lens. The secondary cameras may be selected so that digital images generated by those cameras provide different information than digital images generated based on light reflected through the lens. For example, the secondary camera may include image sensors that are sensitive to infrared light or visible light.

FIG. 7 depicts a flow diagram of a process 700 for identifying a patient by comparing a digital image generated by a secondary camera to a database of digital images generated during past diagnostic sessions. Upon determining that a patient is to be imaged by a retinal camera as part of a diagnostic session, a notification may be generated that instructs the patient to place her eye near the secondary camera (step 701). Normally, the notification requests that the patient align her eye with the secondary camera. However, in some embodiments, the notification requests that the patient align her eye with the lens of the retina camera. The preferred approach may depend on the location of the secondary camera with respect to the lens. That is, the preferred approach may depend on whether the eye is sufficiently observable by the secondary camera when aligned with the lens. In some embodiments, the notification is generated by the retinal camera itself. In other embodiments, a diagnostic platform embodied as a computer program executing on another computing device causes the notification to be generated. For example, a diagnostic platform that resides on a network-connected server system may cause a mobile application executing on a mobile phone associated with the patient to present the notification. Such an approach may be particularly desirable in situations where the retinal camera is not managed by an operator.

Thereafter, the diagnostic platform can acquire a digital image of the eye that was generated by the secondary camera (step 702). Generally, the digital image is a color photograph of the eye, including the pupil and iris, that can be analyzed for the purpose of identification. The diagnostic platform can then compare the digital image to a database of digital images generated during past diagnostic sessions (step 703). As discussed above, the workflow of a diagnostic session may require that at least one eye be imaged by the secondary camera outside of each diagnostic session. Such an approach allows the database may be compiled over time as digital images generated by the secondary camera are analyzed, catalogued, and stored. Each entry in the database corresponding to a patient may include at least one digital image that was generated by a secondary camera and personal information related to the patient. In some embodiments, the diagnostic platform employs pattern-recognition techniques to the digital image in order to facilitate identification through iris recognition. For example, the diagnostic platform may apply a biometric algorithm that considers characteristics such as the color of the iris and the pattern of blood vessels in the retina in determining whether a matching entry exists in the database. These pattern-recognition techniques may be useful in ensuring that the comparison to the database of digital images is performed in a consistent, reliable manner.

In some instances, the diagnostic platform will determine that no matching entries are found in the database. This is most likely to occur if the patient hasn't previously completed a diagnostic session. In such a scenario, personal information related to the patient may be input by an operator of the retinal camera or the patient herself. Alternatively, the operator or patient may be able to identify existing personal information that should be associated with the digital image. For instance, the operator may browse a series of patent records and select a patient record from which personal information is extracted and then associated with the digital image. Thereafter, the diagnostic platform may create an entry in the database for the patient that includes the digital image and the personal information.

In other instances, the diagnostic platform will determine that the digital image matches an entry in the database (step 704). In such a scenario, the diagnostic platform can identify a patient profile that is associated with the matching entry in the database (step 705) and then populate a data structure with personal information obtained from the patient profile (step 706). Generally, the data structure accompanies the digital image(s) that are generated by the retinal camera during the diagnostic session as a means of identification. Such an approach allows digital images generated by the retinal camera during the diagnostic session to be associated with personal information that is automatically provided by the diagnostic platform on behalf of the operator and patient.

Facial biometrics could be used instead of, or in addition to, iris recognition as described above with respect to FIG. 7. Accordingly, the secondary camera may be part of a facial recognition system that is capable of identifying a person based on her facial features. The facial recognition system may work by comparing selected facial features from a digital image generated by a secondary camera with a library of faces in a database. While the accuracy of facial recognition is generally lower than iris recognition, it may be desirable due to its less invasive and resource-intensive nature. The general approach largely remains the same, however. That is, the diagnostic platform can analyze the digital image to discover facial features of a patient and then compare those facial features to the library of faces in the database. Upon determining that a matching entry has been found, the diagnostic platform may automatically populate a data structure associated with the diagnostic session with personal information obtained from a patient profile corresponding to the matching entry.

While the process 700 is described as being performed using a digital image that is generated by a secondary camera, those skilled in the art will recognize that the process 700 could be performed using digital images generated by the primary camera of the retinal camera. For instance, the patient may be prompted to place her eye near the lens of the retinal camera. Then, a digital image of the retina may be captured as part of an initiation process. This digital image may be compared to a database of digital images to identify the patient as discussed above with respect to steps 703-706.

FIG. 8 depicts a flow diagram of a process 800 for identifying a patient based on information that is derived from an identity document. Examples of identity documents include driver licenses, passports, national identification cards, and the like. Upon determining that a patient is to be imaged by a retinal camera as part of a diagnostic session, a notification may be generated that instructs the patient to place an identity document near a secondary camera (step 801). Normally, the secondary camera is one of a pair of secondary cameras that are circumferentially arranged along opposing sides of the lens through which light is collected by the retinal camera. However, some embodiments of retinal camera may only have a single secondary camera. In such embodiments, the secondary camera may be located directly adjacent to the lens or in some other location. Moreover, some embodiments of the retinal camera may not have any secondary cameras. In such embodiments, digital images generated by the primary camera based on light collected through the lens may be used for identification purposes.

In some embodiments, the notification is generated by the retinal camera itself. In other embodiments, a diagnostic platform embodied as a computer program executing on another computing device causes the notification to be generated. For example, a diagnostic platform that resides on a network-connected server system may cause a mobile application executing on a mobile phone associated with the patient to present the notification.

Thereafter, the diagnostic platform can acquire a digital image of the identity document that was generated by the secondary camera (step 802). Generally, the digital image is a color photograph of the identity document that can be analyzed for the purpose of identification. In some embodiments, the digital image may be generated by another computing device (e.g., a mobile phone or a tablet computer) that is communicatively connected to the diagnostic platform, as shown in FIG. 4. The diagnostic platform can then derive information related to the patient by applying a text recognition algorithm (also referred to as an "optical character recognition algorithm" or "OCR algorithm") to the digital image (step 803). The OCR algorithm may be designed to employ either matrix matching or feature extraction to produce ranked lists of candidate characters. Matrix matching involves comparing the digital image to a library of stored glyphs on a pixel-by-pixel basis, while feature extraction involves decomposing glyphs into "features" like lines, closed loops, line direction, and line intersections from which characters can be inferred. Thus, the diagnostic platform may employ either matrix matching or feature extraction to produce, for each character, a ranked list of candidate characters and then derive the information based on the ranked lists of candidate characters produced for the identity document. In some embodiments, the diagnostic platform applies pre- or post-processing algorithms in addition to the OCR algorithm. These processing algorithms may be helpful in ensuring that recognition is completed successfully. These processing algorithms may employ techniques such as despeckling, zoning, segmentation, normalization, etc. Said another way, these processing algorithms may perform despeckling, zoning, segmenting, or normalizing of pixels in the digital image so as to image its quality before OCR is completed.

In some embodiments, the information derived from the identity document is compared to a database of known identifications that is unrelated to past diagnostic sessions. For example, the diagnostic platform could provide this information to a data verification service to verify that the information on the identity document matches data held by the jurisdiction responsible for issuing the identity document. An example of a data verification service is the Driver's License Data Verification (DLDV) Service. Accordingly, the diagnostic platform may receive, from the data verification service, input that indicates whether the information was verified as matching data maintained by the jurisdiction responsible for issuing the identity document. A data structure could be populated with the information by the diagnostic platform following verification by the data verification service. Additionally or alternatively, the diagnostic platform may populate the data structure with information that is obtained from the data verification service. Another example of a data verification service is Face ID. In this scenario, the diagnostic platform may extract an image of a face from the identity document and then provide the image to the data verification service. By comparing the image to a database of facial images, the data verification service can authenticate the identity of the patient.

Figure 9:
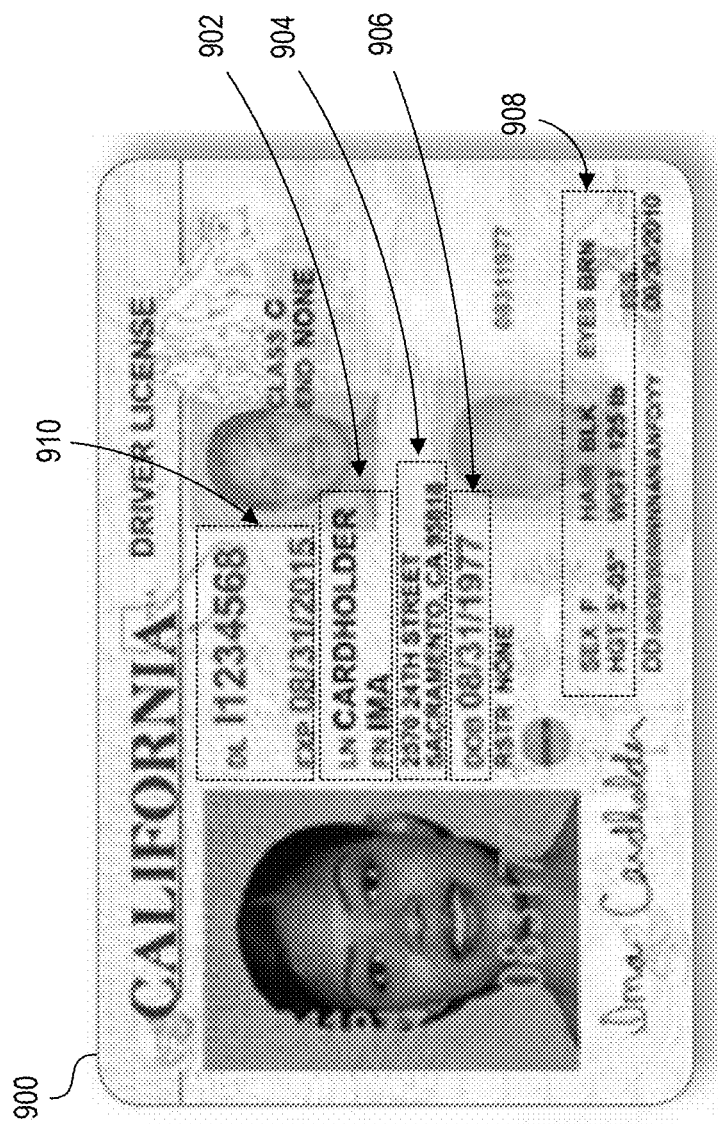
FIG. 9 illustrates how various types of information could be extracted from an identity document (here, a driver license).

FIG. 9 illustrates how various types of information could be extracted from an identity document 900 (here, a driver license). By analyzing a digital image of an identity document 900, the diagnostic platform may be able to establish the name 902, residence 904, and date of birth 906 of the patient. Moreover, the diagnostic platform may be able to obtain and/or infer physical information 908 and document information 910. Examples of physical information 908 include the sex, height, weight, hair color, and eye color, while examples of document information 910 include the document identifier, expiration date, and issuance date.

The diagnostic platform may populate a data structure with at least some of the information obtained from the identity document (step 804). Generally, the data structure accompanies the digital image(s) that are generated by the retinal camera during the diagnostic session as a means of identification. Thus, the diagnostic platform may populate a data structure encoded with a digital image of the eye of the patient with at least some of the information obtained from the digital image of the identity document. Alternatively, the diagnostic platform may use the information to identify a patient profile and then populate the data structure with information obtained from the patient profile.

FIG. 10 depicts a flow diagram of a process 1000 for identifying a patient using machine-readable identifiers (or simply "identifiers") that are presented to a retinal camera outside of a diagnostic session. Here, the process 1000 is described in the context of a Quick Response (QR) code that is viewable on a computing device associated with the patient, such as a mobile phone or wearable electronic device. However, the process 1000 is similarly applicable to other identifiers, such as Bluetooth Low Energy (BLE) signals (also referred to as "BLE codes"), NFC signals (also referred to as "NFC codes"), radio frequency identification (RFID) signals (also referred to as "RFID codes"), audible tones (also referred to as "audible codes" or "audio codes"), barcodes, and the like. Accordingly, the term "machine-readable identifier" may not only be used to refer to visual codes that can be observed by the retinal camera, but also audible codes that can be "read" by the retinal camera when audibly or electronically emitted by the computing device.

The process 1000 of FIG. 10 is similar to the processes 700, 800 of FIGS. 7-8 in several respects. Initially, a notification is generated that instructs the patient to place the QR code near a secondary camera of a retinal camera (step 1001). In some embodiments the notification is generated by the retinal camera itself, while in other embodiments the notification is generated by the computing device associated with the patient. For example, a mobile application executing on a mobile phone associated with the patient may be configured to generate the notification responsive to a determination that the mobile phone (and thus the patient) has come within a specified proximity of the retinal camera. As another example, a mobile application executing on a mobile phone associated with the patient may be configured to generate the notification responsive to a determination that a start time of a diagnostic session has been reached.

Then, the retinal camera can examine the QR code to obtain information that is embedded therein (step 1002). The QR code may contain sensitive information about the patient or diagnostic session that can be used to populate a data structure. Alternatively, the QR code may contain non-sensitive information that can be used to retrieve sensitive information from, for example, a patient profile maintained on a network-accessible storage system. Regardless of the approach, the information embedded within can be used to automatically populate a data structure on behalf of the patient (step 1003). Generally, the data structure accompanies the digital image(s) that are generated by the retinal camera during the diagnostic session as a means of identification.

Those skilled in the art will recognize that the process 1000 will be different if a non-visual identifier is presented to the retinal camera. For example, the retinal camera may be able to receive non-imaging biometrics, such as fingerprints, as input for the purpose of identification. As another example, the computing device associated with the patient may be instructed to emit a BLE code, NFC code, RFID code, or audio code in order to register for a diagnostic session. In such instances, the retinal camera does not necessarily need to have a secondary camera. Instead, the retinal camera may have an appropriate receiver for detecting these broadcasted codes. Thus, the retinal camera could include a compatible communication module (e.g., wireless communication circuitry) and computer program for detecting BLE codes, NFC codes, or RFID codes. Similarly, the retinal camera could include a microphone for detecting audio codes.

FIG. 11 depicts a flow diagram of a process 1100 for performing closed loop analysis by examining digital images generated under different conditions. Initially, the diagnostic platform can acquire a first digital image generated by the retinal camera based on light collected through a lens (step 1101). As discussed above, this light may be representative of light that was reflected by the retina of a patient during a diagnostic session.

The diagnostic platform can then apply a diagnostic model to the first digital image to produce an output that is indicative of the health state of the patient (step 1102). Because the diagnostic model considers the pixel content of the first digital image, the output may be accompanied by a metric that is indicative of confidence in the output. The metric represents the amount of confidence that the diagnostic platform has in the output. The metric is normally related to the degree of similarity between the first digital image and digital images that were provided to the diagnostic model for training purposes. At a high level, if the first digital image is similar to one used for training purposes, then the diagnostic model may know the appropriate output with a reasonably high degree of confidence.

Thereafter, the diagnostic platform can determine whether confidence in the output produced by the diagnostic models falls beneath a threshold. In the event that the diagnostic platform determines that confidence exceeds the threshold, then the diagnostic session may be allowed to proceed. However, in the event that the diagnostic platform determines that confidence falls beneath the threshold (step 1103), the diagnostic platform may cause the retinal camera to generate a second digital image under different conditions than the first digital image (step 1104). For example, the diagnostic platform may instruct the retinal camera to alter the focal point, focal length, color balance, exposure, lighting condition, or any combination thereof. As an example, if the first digital image is generated using infrared light that is emitted by the retinal camera, then the diagnostic platform may instruct the retinal camera to generate the second digital image using visible light, or vice versa. Similarly, the diagnostic platform may instruct the retinal camera to generate the second digital image such that the second digital image has a different focal point, focal length, color balance, or exposure than the first digital image.

The diagnostic platform can then analyze the second digital image—either alone or in combination with the first digital image—to determine whether the first digital image includes the left eye or the right eye of the patient (step 1105). Then, the diagnostic platform can label the first digital image as being representative of the left eye or the right eye (step 1106).

In some embodiments, the diagnostic platform stores the first digital image in a profile (step 1107). For example, if the profile is associated with the patient, the diagnostic platform may encode the first digital image in a data structure that is representative of the profile so as to form a temporal record of digital images associated with the patient. Alternatively, the profile may be associated with the retinal camera, the diagnostic session, the healthcare facility at which the retinal camera is located, the healthcare network that manages the retinal camera, etc. Because the second digital image is normally used as a means to improve confidence in the output produced for the first digital image, the diagnostic platform may normally refrain from storing the second digital image in the profile. In some embodiments, however, the diagnostic platform does store the second digital image in the profile.

Those skilled in the art will recognize that a comparable process may be performed if, for example, the diagnostic platform is not confident in its determination of whether the eye being imaged by the retinal camera is the left eye or the right eye. In such a situation, the diagnostic platform may request that another digital image of the eye be generated under different conditions in an attempt to increase confidence in its determination of left eye versus right eye.

Unless contrary to physical possibility, it is envisioned that the steps described above may be performed in various sequences and combinations. For example, step 1103 of FIG. 11 may not be performed in some embodiments. In such embodiments, the diagnostic platform may cause the second digital image to be generated under different conditions regardless of confidence in the output produced by the diagnostic model. The diagnostic platform may simply perform closed loop analysis to gain insights (e.g., into which body part is being imaged, into whether the output is correct) by examining digital images generated under different conditions.

As another example, the diagnostic platform may cause digital images generated by the secondary camera to be displayed on an interface while the processes described herein are being performed. Such action may be performed contemporaneously with automatically populating a data structure on behalf of an operator so that the operator can confirm the data structure was populated correctly.

The approaches described herein may be particularly useful in unconventional ecosystems (e.g., non-clinical environments). Assume, for example, that a retinal camera is located in a self-serve kiosk that is not accompanied by an operator. In such a scenario, these approaches could be used to verify the identity of each patient being imaged without requiring that those patients manually input information. For example, a patient could simply approach the self-serve kiosk, present a QR code on her mobile phone to the retinal camera, and then complete a diagnostic session. The retinal camera (or some other computing device) can associate the digital images generated during the diagnostic session with the patient using information contained in the QR code.

The approaches may also enable the amount of personal information stored on a retinal camera to be limited. Again, consider a scenario where a retinal camera is located in a self-serve kiosk that is not accompanied by an operator. In such a scenario, storing personal information on the retinal camera represents a security risk due to its accessibility. To address this concern, the retinal camera may only collect digital images generated as part of a diagnostic session and basic metadata. Then, the digital images can be associated with a patient (and her personal information) on another computing device, such as a computer server, using the basic metadata.

Processing System

Figure 12:
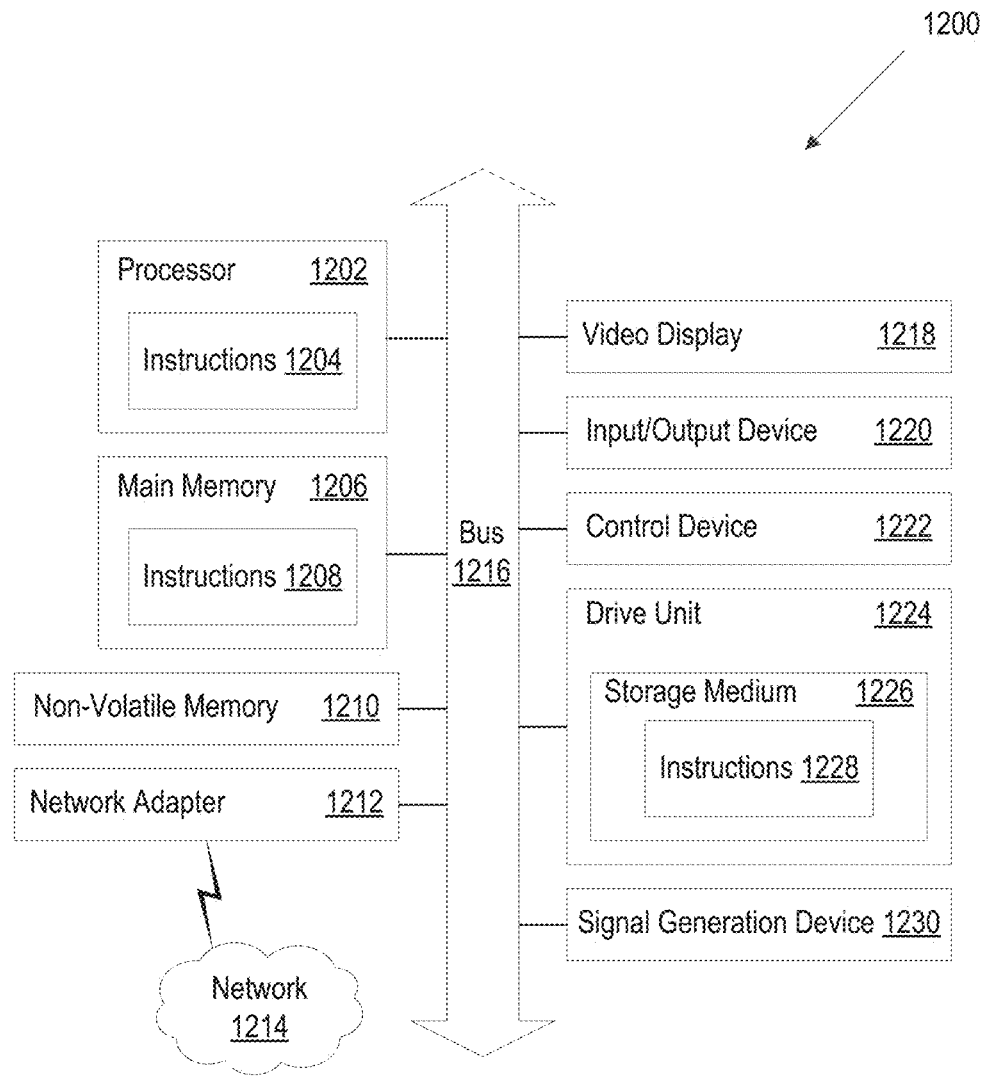
FIG. 12 is a block diagram illustrating an example of a processing system in which at least some operations described herein can be implemented.

FIG. 12 is a block diagram illustrating an example of a processing system 1200 in which at least some operations described herein can be implemented. For example, some components of the processing system 1200 may be hosted on a computing device that includes a diagnostic platform (e.g., diagnostic platform 302 of FIG. 3 or diagnostic platform 402 of FIG. 4).

The processing system 1200 may include a central processing unit (also referred to as a "processor") 1202, main memory 1206, non-volatile memory 1210, network adapter 1212, video display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an Inter-Integrated Circuit ($I^2C$) bus, or an Institute of Electrical and Electronics Engineers (IEEE) standard 1394 bus (also referred to as "Firewire").

The processing system 1200 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1200.

While the main memory 1206, non-volatile memory 1210, and storage medium 1226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1228. The term "machine-readable medium" and "storage medium" shall also be taken to include any medium that is capable of storing, encoding, or carrying a set of instructions for execution by the processing system 1200.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computing device. When read and executed by the processor 1202, the instruction(s) cause the processing system 1200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile memory, non-volatile memory 1210, floppy and other removable disks, hard disk drives, optical disks (e.g., compact disc read-only memory (CD-ROMs) and Digital Versatile Discs (DVDs)), and transmission-type media such as digital and analog communication links.

The network adapter 1212 enables the processing system 1200 to mediate data in a network 1214 with an entity that is external to the processing system 1200 through any communication protocol supported by the processing system 1200 and the external entity. The network adapter 1212 can include a network adaptor card, a wireless network interface card, a router, an access point, a wireless router, a switch, a multilayer switch, a protocol converter, a gateway, a bridge, a bridge router, a hub, a digital media receiver, or a repeater.

The network adapter 1212 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A non-transitory medium with instructions stored thereon that, when executed by a processor, cause the processor to perform operations comprising:
    generating a notification that instructs a patient to place an eye near a retinal camera;
    acquiring a first digital image of the eye that was generated by the retinal camera;
    comparing the first digital image to a database of digital images associated with past diagnostic sessions;
    determining that the first digital image matches an entry in the database;
    identifying a profile that is associated with the matching entry in the database; and
    populating a data structure with information obtained from the profile before encoding a second digital image of the eye to the data structure,
    wherein the second digital image is generated by the retinal camera based on light reflected by a retina of the eye and through a lens of the retinal camera.

2. The non-transitory medium of claim 1, wherein the notification instructs the patient to align the eye with a secondary camera located proximate to the lens of the retinal camera, and wherein the first digital image is generated by the secondary camera.

3. The non-transitory medium of claim 1, wherein the notification instructs the patient to align the eye with the lens of the retinal camera, and wherein the first digital image is generated by a secondary camera located proximate to the lens of the retinal camera.

4. The non-transitory medium of claim 1, wherein the processor is housed in the retinal camera.

5. The non-transitory medium of claim 1, wherein the processor is housed in a computing device to which the retinal camera is communicatively connected.

6. The non-transitory medium of claim 1, wherein said comparing comprises:
    executing a biometric algorithm that compares (i) a color of the iris of the eye and/or (ii) a pattern of blood vessels in the retina of the eye to each digital image in the database so as to determine the matching entry.

* * * * *